(12) United States Patent
Scogna et al.

(10) Patent No.: US 9,139,040 B2
(45) Date of Patent: Sep. 22, 2015

(54) OMNI-DIRECTIONAL WHEEL ASSEMBLY

(76) Inventors: Jules Scogna, Drexel Hill, PA (US);
Adam Schuman, Swarthmore, PA (US)

(*) Notice: Subject to any disclaimer, the term of this patent is extended or adjusted under 35 U.S.C. 154(b) by 843 days.

(21) Appl. No.: 13/437,871

(22) Filed: Apr. 2, 2012

(65) Prior Publication Data

US 2012/0256471 A1 Oct. 11, 2012

Related U.S. Application Data

(60) Provisional application No. 61/516,587, filed on Apr. 5, 2011.

(51) Int. Cl.
*B60B 19/12* (2006.01)
*B60B 19/00* (2006.01)

(52) U.S. Cl.
CPC ............. *B60B 19/003* (2013.01); *B60B 19/12* (2013.01)

(58) Field of Classification Search
CPC ...... B60B 19/003; B60B 19/12; B60B 19/125
USPC ................... 301/5.1, 5.23, 104; 180/5.1, 7.1; 16/18 R, 45, 46, 47
See application file for complete search history.

(56) References Cited

U.S. PATENT DOCUMENTS

| | | | |
|---|---|---|---|
| 1,108,538 A | 8/1914 | Wood | |
| 1,433,435 A | 10/1922 | Van Horn | |
| 2,182,946 A | 12/1939 | Landgreen | |
| 2,204,650 A | 6/1940 | Benjamin | |
| 2,255,004 A | 9/1941 | Rodanet | |
| 2,454,130 A | 11/1948 | Braun | |
| 2,661,068 A | 12/1953 | Gaskill | |
| 3,876,255 A | 4/1975 | Ilon | |
| 5,445,497 A | 8/1995 | Seemar | |
| 5,551,347 A | 9/1996 | Gutknecht | |
| 5,551,349 A * | 9/1996 | Bodzin | 104/138.2 |
| 5,701,966 A | 12/1997 | Amico | |
| 5,984,287 A | 11/1999 | Fitzsimmons | |
| 6,340,065 B1 | 1/2002 | Harris | |
| 6,394,203 B1 | 5/2002 | Harris | |
| 6,409,010 B1 | 6/2002 | Leon | |
| 6,547,340 B2 | 4/2003 | Harris | |
| 7,621,355 B2 | 11/2009 | Chu et al. | |
| 7,641,288 B1 | 1/2010 | Baker et al. | |
| 8,011,735 B2 | 9/2011 | Scogna et al. | |
| 8,496,299 B2 * | 7/2013 | Brudniok | 301/5.23 |
| 2002/0024250 A1 * | 2/2002 | Bandou et al. | 301/5.23 |
| 2008/0018167 A1 * | 1/2008 | Fuji | 301/5.23 |
| 2010/0156168 A1 * | 6/2010 | Scogna et al. | 301/5.23 |
| 2011/0209932 A1 * | 9/2011 | Takenaka et al. | 180/15 |
| 2011/0272998 A1 * | 11/2011 | Lee | 301/5.23 |
| 2012/0084939 A1 * | 4/2012 | Kim et al. | 15/415.1 |

* cited by examiner

*Primary Examiner* — Kip T Kotter
(74) *Attorney, Agent, or Firm* — Joseph E. Maenner; Maenner & Associates, LLC

(57) ABSTRACT

The kit includes a hub having a central axis and a perimeter. The perimeter comprises a plurality of flat spoke faces extending therearound. A spoke assembly is releasably couplable to each spoke face. Each spoke assembly is aligned with an adjacent spoke assembly to form a spoke. A method of assembling the wheel assembly is also provided.

13 Claims, 17 Drawing Sheets

OMNI-DIRECTIONAL WHEEL ASSEMBLY

CROSS-REFERENCE TO RELATED APPLICATION

The present application claims priority from U.S. Provisional Patent Application Ser. No. 61/516,587, filed on Apr. 5, 2011, which is Incorporated herein by reference in its entirety.

BACKGROUND OF THE INVENTION

A Mecanum wheel assembly is well known for providing a drive mechanism to a vehicle that allows the vehicle to move in all directions, including laterally, by rotating the wheel assemblies of the vehicle in different directions. Each wheel assembly includes a plurality of rollers disposed around the perimeter of a central hub. An exemplary prior art design of a Mecanum wheel is disclosed in U.S. Pat. No. 3,876,255, and is incorporated herein by reference.

The hub geometry of a standard Mecanum wheel assembly is relatively complex, with roller axes being formed obliquely to a central hub axis. Further, both left-handed and right-handed hubs are required, at least one for each side of the vehicle. Left-handed hubs are mirror images of right-handed hubs, requiring spares of each of left-handed and right-handed hubs in the event of the failure of one of the hubs. There exists a need to improve the hub geometry of the Mecanum wheel.

SUMMARY OF THE INVENTION

Briefly, the present invention provides a wheel assembly comprising a hub having a central axis and a perimeter. The kit includes a hub having a central axis and a perimeter. The perimeter comprises a plurality of flat spoke faces extending therearound. A spoke assembly is releasably coupled to each spoke face. Each spoke assembly is aligned with an adjacent spoke assembly. A roller axle assembly extending through each of the adjacent spoke assemblies The present invention further provides a wheel assembly comprising a generally hexagonally shaped hub assembly and a plurality of generally "U" shaped spoke assemblies extending outwardly from the hub assembly. Each spoke assembly as a first spoke and a second spoke wherein the first spoke is in contact with a first adjacent spoke assembly and wherein the second spoke is in contact with a second adjacent spoke assembly. A roller axle assembly extends through two adjacent of the spoke assemblies.

Additionally, the present invention further provides wheel assembly comprising a hub body having a perimeter. The perimeter is polygonal in shape. A plurality of adjacent spoke assemblies extends around the perimeter. The plurality has the same number as the sides in the hub polygon. The assembly further includes a like plurality of roller axle assemblies. Each of the like plurality of roller axle assemblies extending through a pair of the adjacent spoke assemblies.

BRIEF DESCRIPTION OF THE DRAWINGS

The forgoing summary, as well as the following detailed description of preferred embodiments of the invention, will be better understood when read in conjunction with the appended drawings, which are incorporated herein and constitute part of the specification. For the purposes of illustrating the invention, there are shown in the drawings exemplary embodiments of the present invention. It should be understood, however, that the invention is not limited to the precise arrangements and instrumentalities shown. In the drawings, the same reference numbers are employed for designating the same elements throughout the several figures. In the drawings.

DETAILED DESCRIPTION OF THE INVENTION

Although the invention is illustrated and described herein with reference to a specific embodiment, the invention is not intended to be limited to the details shown. Rather, various modifications may be made in the details within the scope and range of the equivalence of the claims and without departing from the invention. The invention is best understood from the following detail description when read in conjunction with the accompanying drawing figures, which show exemplary embodiments of the invention selected for illustrative purposes. The invention will be illustrated with reference to the figures. Such figures are intended to be illustrative rather than limiting and are included herewith to facilitate the explanation of the present invention.

Figure 1:
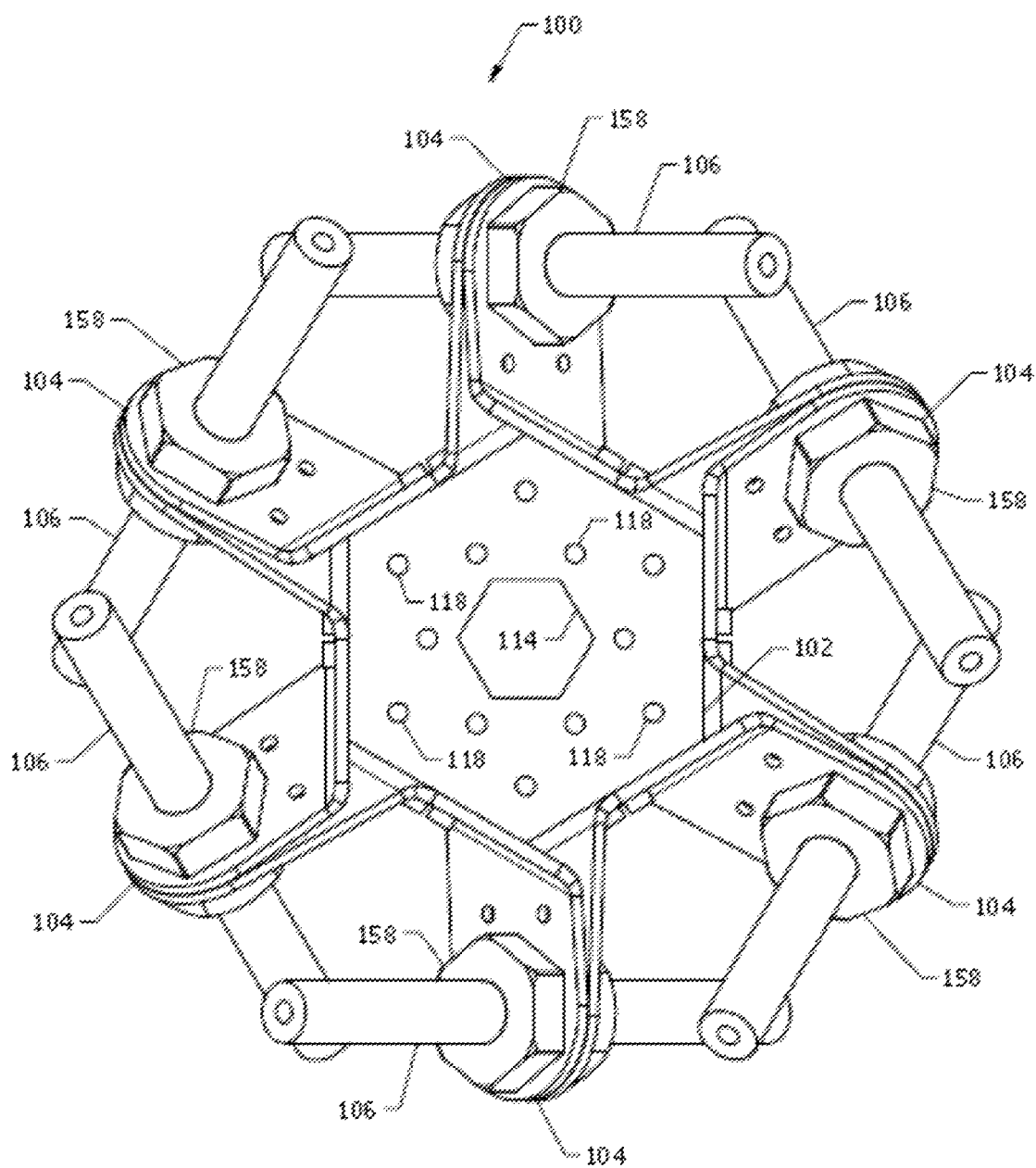
FIG. 1 is a side elevational view of a wheel assembly according to an exemplary embodiment of the present invention.
Figure 2:
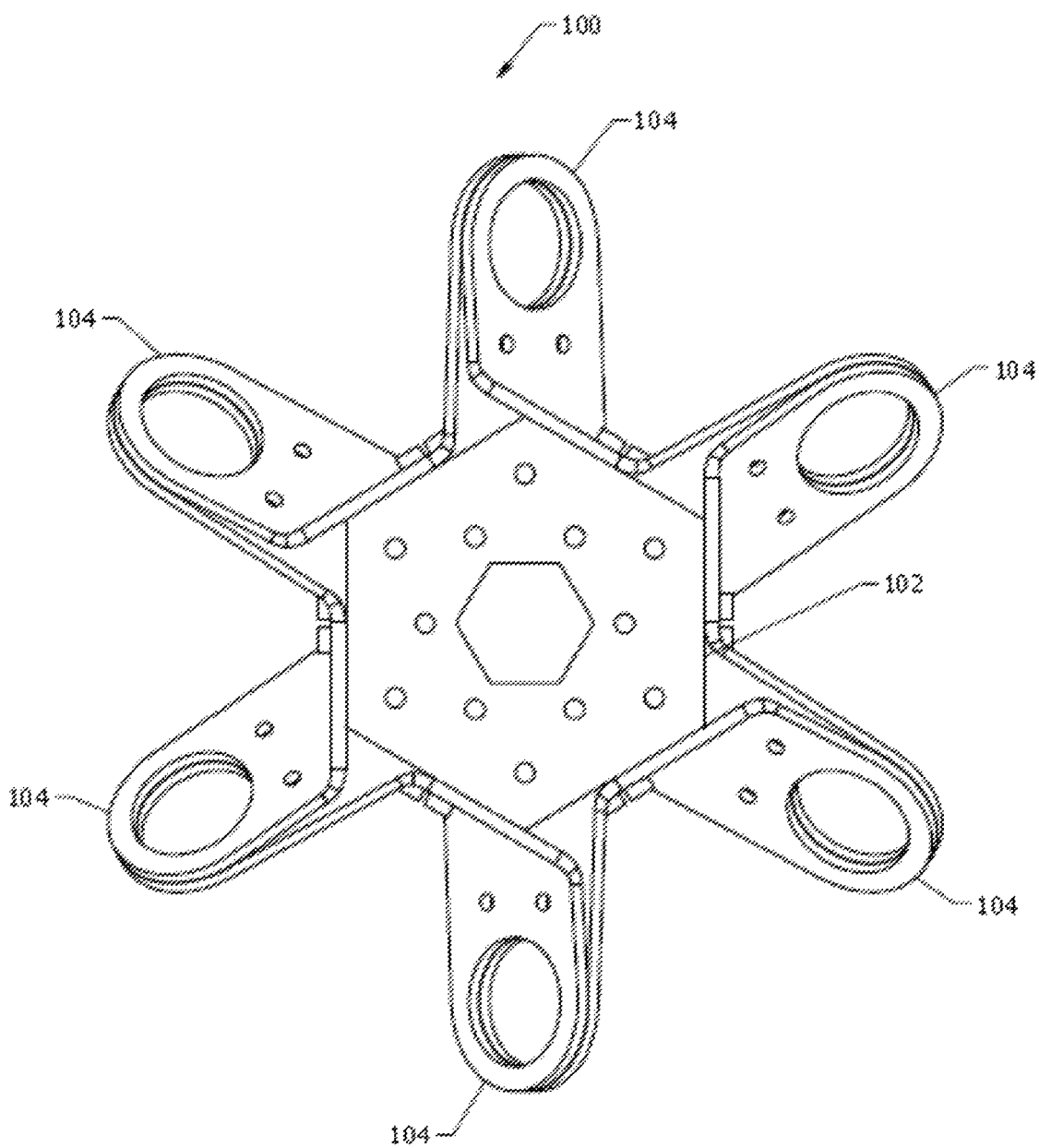
FIG. 2 is a side elevational view of the wheel assembly of FIG. 1, with wheel axles removed for clarity.
Figure 3:
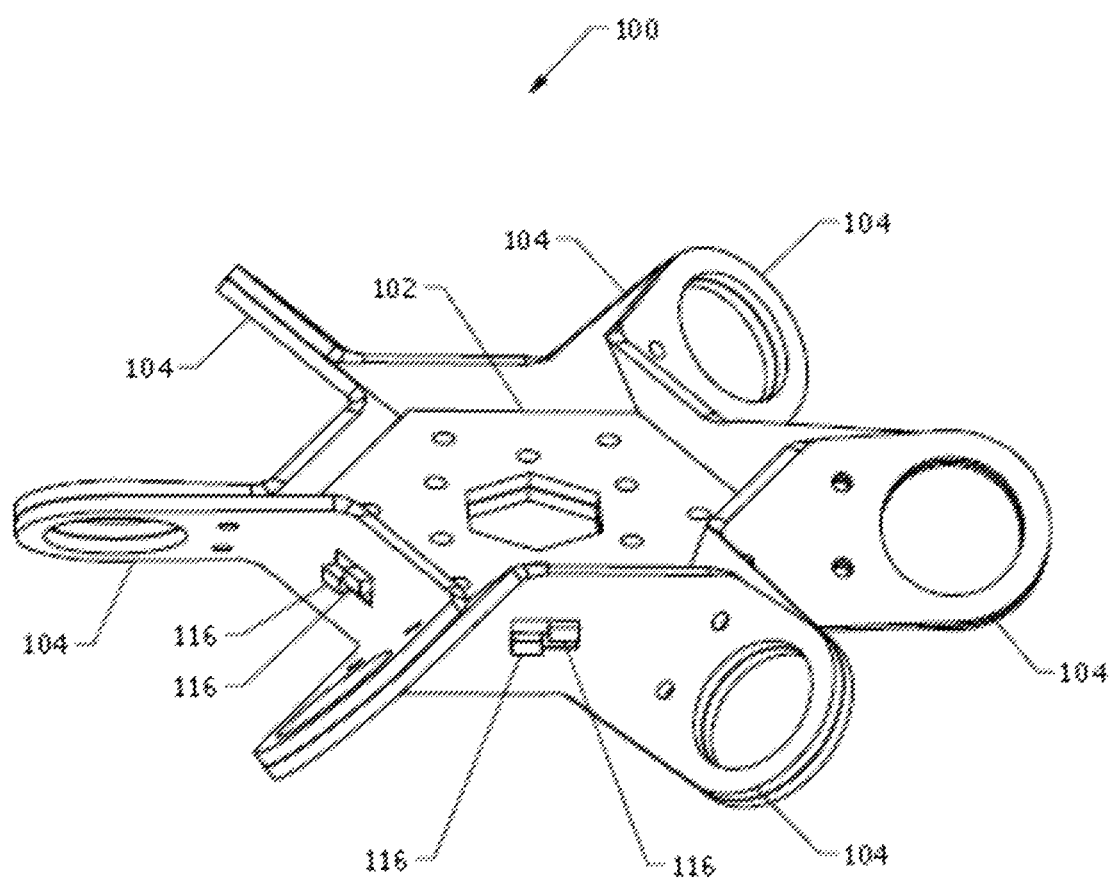
FIG. 3 is a perspective view of the wheel assembly of FIG. 2.

Referring to the figures in general, a wheel assembly 100 according to an exemplary embodiment of the present invention is shown. Wheel assembly 100 may be constructed from a kit that includes a hub assembly 102 and a plurality of spoke assemblies 104 that may be arranged and releasably coupled to hub assembly 102 in a configuration that results in an assembled wheel to meet the operational requirements of the user. For example, wheel assembly 100 may be assembled to provide either a left-handed or a right-handed wheel for use in an omni-directional vehicle that allows for sideways vehicle movement as well as rotation of the vehicle about a vehicle axis. FIGS. 1-3 show a wheel assembly 100 in a left-handed configuration. As shown in FIG. 3, a roller axle assembly 106 may be coupled to each spoke assembly 104. Wheels (not shown) may be rotatably affixed to the end of each roller axle assembly 106. Exemplary wheels are disclosed in U.S. Pat. No. 8,011,735, which is incorporated by reference herein in its entirety.

Figure 4:
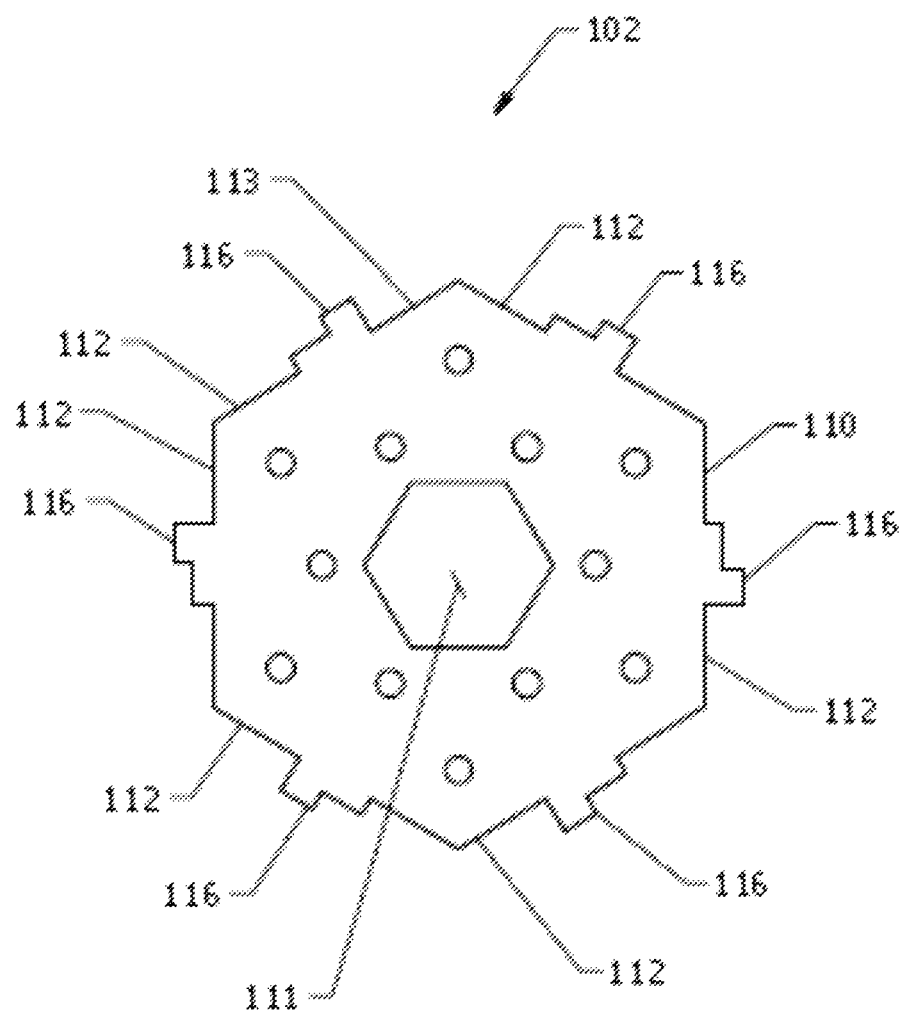
FIG. 4 is a side elevational view of a hub used in the wheel assembly of FIG. 1.

Referring to FIG. 4, hub assembly 102 includes a pair of generally flat planar, hexagonally-shaped bodies 110, each having a central axis 111. As shown in FIG. 4, central axis 111 extends vertically from the plane the paper. Body 110 includes a plurality of spoke faces 112 that extend around an outer perimeter 113 of body 110. As shown in FIG. 4, six spoke faces 112 are used in the exemplary embodiment. Those skilled in the art, however, will recognize that more or less than six spoke faces 112 may be used. In such a case, each body 110 has a common polygonal size and shape.

A locking tang 116 extends from each spoke face 112 away from central axis 111. Locking tang 116 is used to locate each respective spoke assembly 104 and secure spoke assembly 104 to hub assembly 102. Locking tang 116 includes a stepped configuration in order to optionally allow a user to insert a screwdriver (not shown) between locking tangs 116 of adjacent hub assemblies 102 in order to secure locking tangs 116 to their respective spoke assemblies 104. Additionally, a plurality of through holes 118 may extend through body 110. Through holes 118 may optionally be used to secure a pair of hub bodies 110 to each other with connecting elements, such as screws (not shown).

Hub body 110 may be machined from hexagonal bar stock. Alternatively, hub body 110 may be stamped from a metal sheet. Alternatively, hub body 110 may be laser cut, water jet cut, or cut by any other suitable method. Hub body 110 also includes a hexagonal central opening 114 that is sized to match a longitudinally extending axle (not shown), extending along central axis 111, that is used to drive wheel assembly 100. Those skilled in the art, however, will recognize that central opening 114 may be a shape other than hexagonal.

Figure 5:
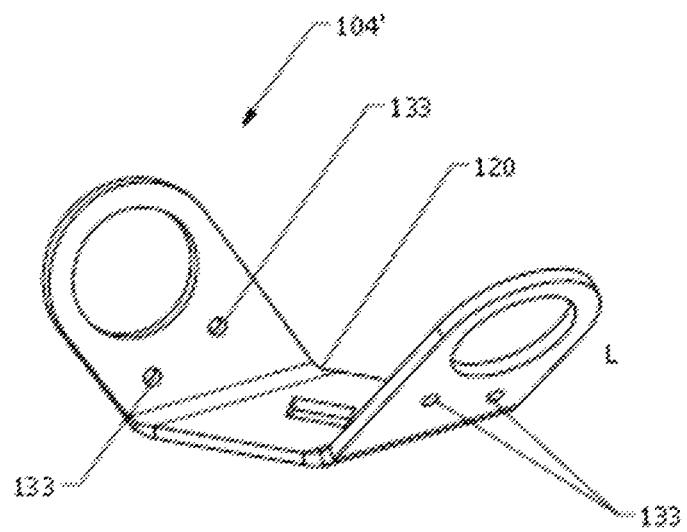
FIG. 5 is a perspective view of a left-handed spoke assembly for use with the hub of FIG. 4.
Figure 6:
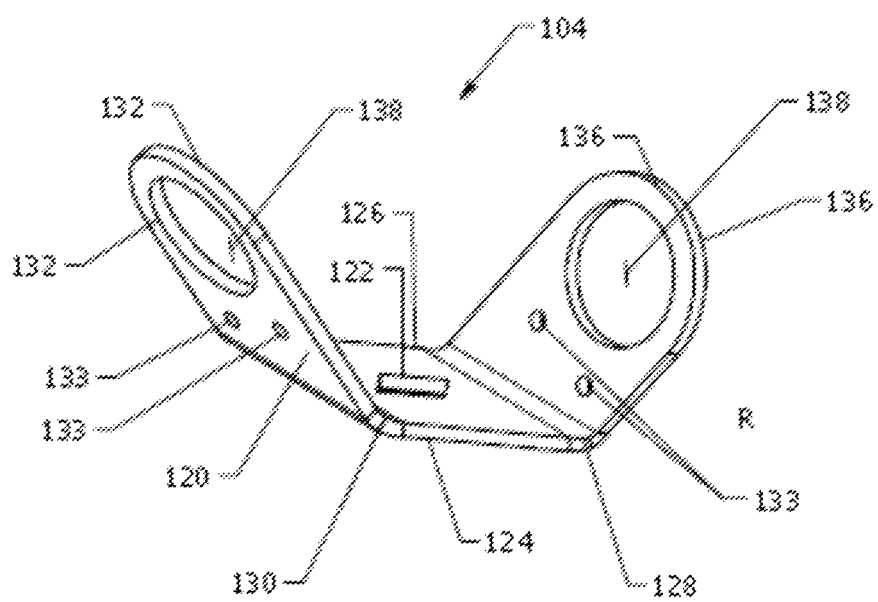
FIG. 6 is a perspective view of a right-handed spoke assembly for use with the hub of FIG. 4.

Referring to FIGS. 5-6, a left-handed spoke assembly 104' and a right-handed spoke assembly 104 are shown, respectively. Left-handed spoke assembly 104' is to be used on wheels that will be located on the left front and right rear sides of a vehicle (not shown) while right-handed spoke assembly 104 is to be used on wheels that will be located on the right front and left rear sides of the vehicle. For ease of description, only spoke assembly 104 will be discussed, but the description will pertain to spoke assembly 104' as well.

Each spoke assembly 104 includes a base 120 that engages with a spoke face 112. Base 120 includes a generally rectangular slot 122 through which locking tang 116 is inserted. Slot 122 is sufficiently wide to allow two (2) hub bodies 110 to be placed alongside each other with tangs 116 offset from each other as shown in FIG. 3. A like number of spoke assemblies 104 as spoke faces 112 are used.

Base 120 has a parallelogram shape with opposing free sides 124 and 126 and spoke sides 128 and 130 extending between free sides 124 and 126. The long sides of rectangular slot 122 extend generally parallel to free sides 124 and 126.

A spoke 132 extends from each of spoke sides 128 and 130. Each spoke 132 has a connected end 134 that is connected to one of spoke sides 128 and 130 and a free end 136. Free end 136 includes a generally circular slot 138 that is sized to allow roller axle assembly 106 to extend therethrough. Each spoke 132 may also optionally include a pair of through openings 133 that allow a connecting element, such as a screw (not shown), to fixedly connect spokes 132 of adjacent spoke assemblies 104 to each other.

Figure 7:
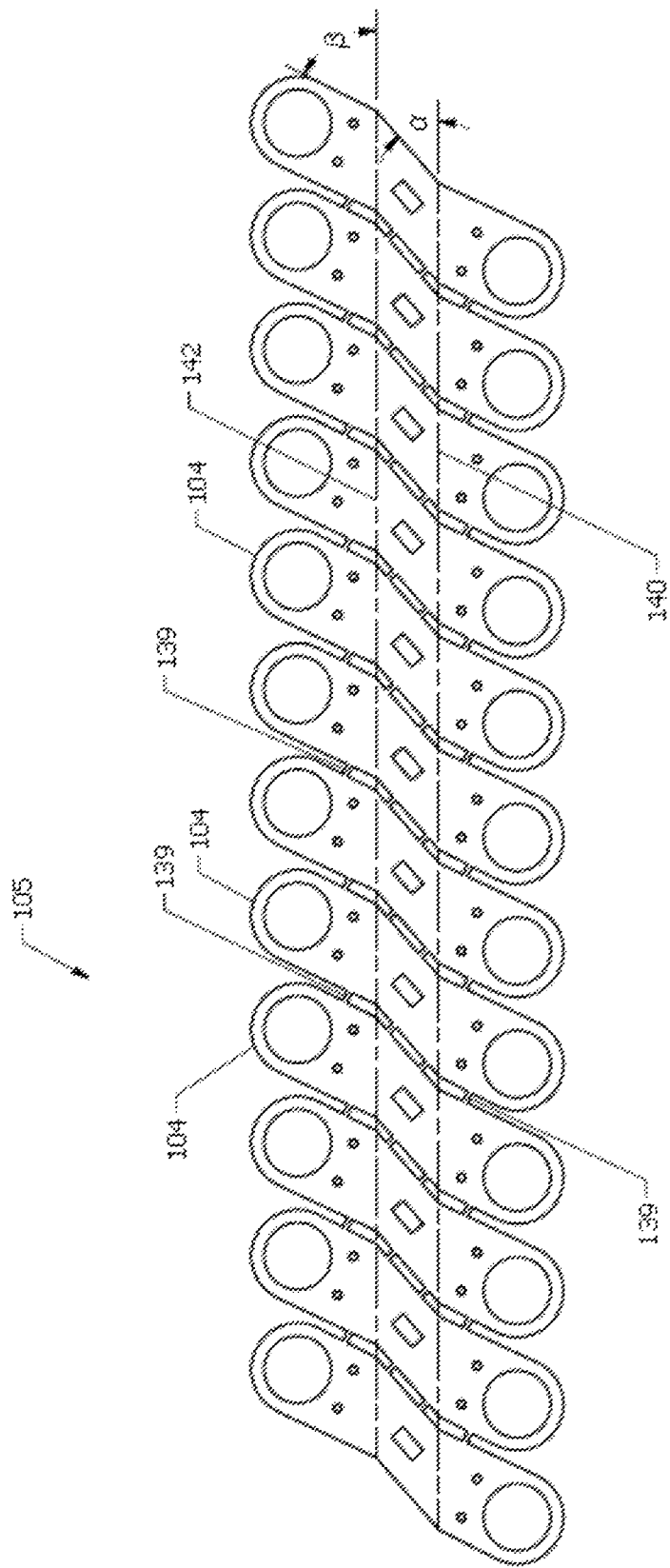
FIG. 7 is a top plan view of a strip of spoke assemblies prior to bending.

As shown FIG. 7, a plurality of spoke assemblies 104 can be formed from a single sheet of metal. In an exemplary embodiment, twelve (12) spoke assemblies 104 are formed from a sheet 105. The twelve spoke assemblies 104 provide a sufficient amount of spoke assemblies 104 to fabricate two wheel assemblies 100, with six spoke assemblies 104 per wheel assembly 100.

Adjacent spoke assemblies 104 are connected to each other by a plurality of ribs 139 that serve to separate adjacent spoke assemblies 104. Ribs 139 are removed prior to connecting spoke assembly 104 to hub assembly 102. As shown in FIG. 7, a pair of parallel bend lines 140 and 142 separate each base 120 from its respective spokes 132. Base 120 extends at an angle α relative to bend line 140 and spokes 132 extended an angle β relative to bend line 142. In an exemplary embodiment, angle α is about 41 degrees and angle β is about 63 degrees. In an exemplary embodiment, a perpendicular distance from bend line 140 to free end 136 of spoke 132 is about 1.513 inches and a perpendicular distance between bend line 140 and bend line 142 is about 0.52 inches.

Figure 8:
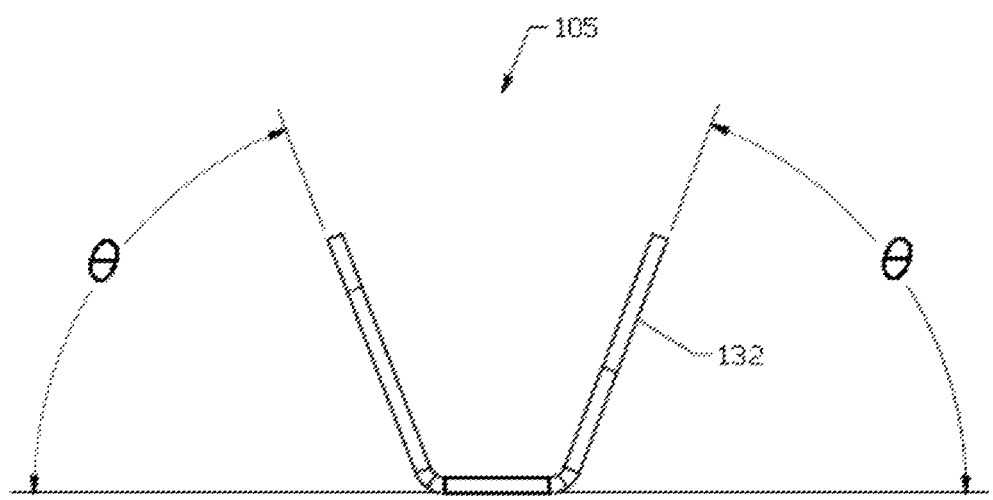
FIG. 8 is a side elevational view of the strip of spoke assemblies shown in FIG. 7 after bending.
Figure 9:
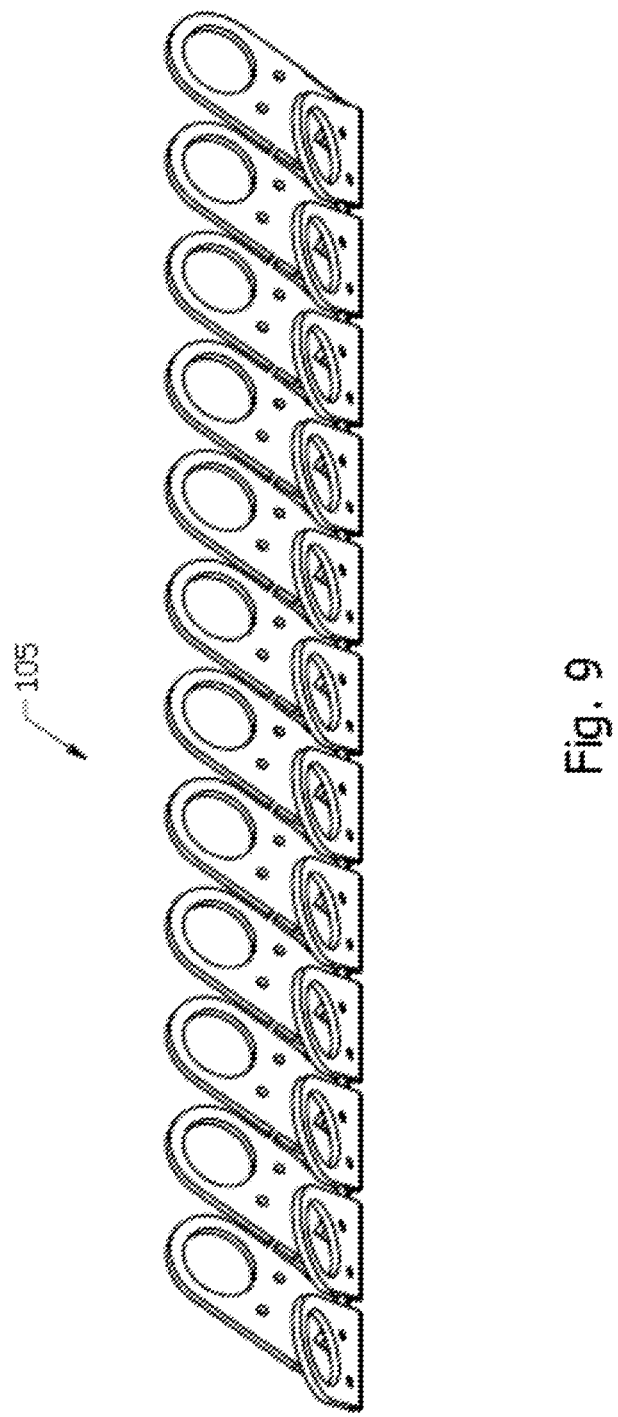
FIG. 9 is a perspective view of the strip of spoke assemblies shown in FIG. 7, after bending.

Prior to separating spoke assemblies 104 from sheet 105, sheet 105 is bent at bend lines 140, 142 at an angle θ. In an exemplary embodiment, as shown in FIG. 8, angle θ is about 69.3°. As shown in FIG. 8, each spoke assembly 104 appears generally as a "U" in a side elevational view, with spokes 132 being the legs and base 120 being the base of the "U". A perspective view of sheet 105 after bending is shown in FIG. 9.

Figure 10:
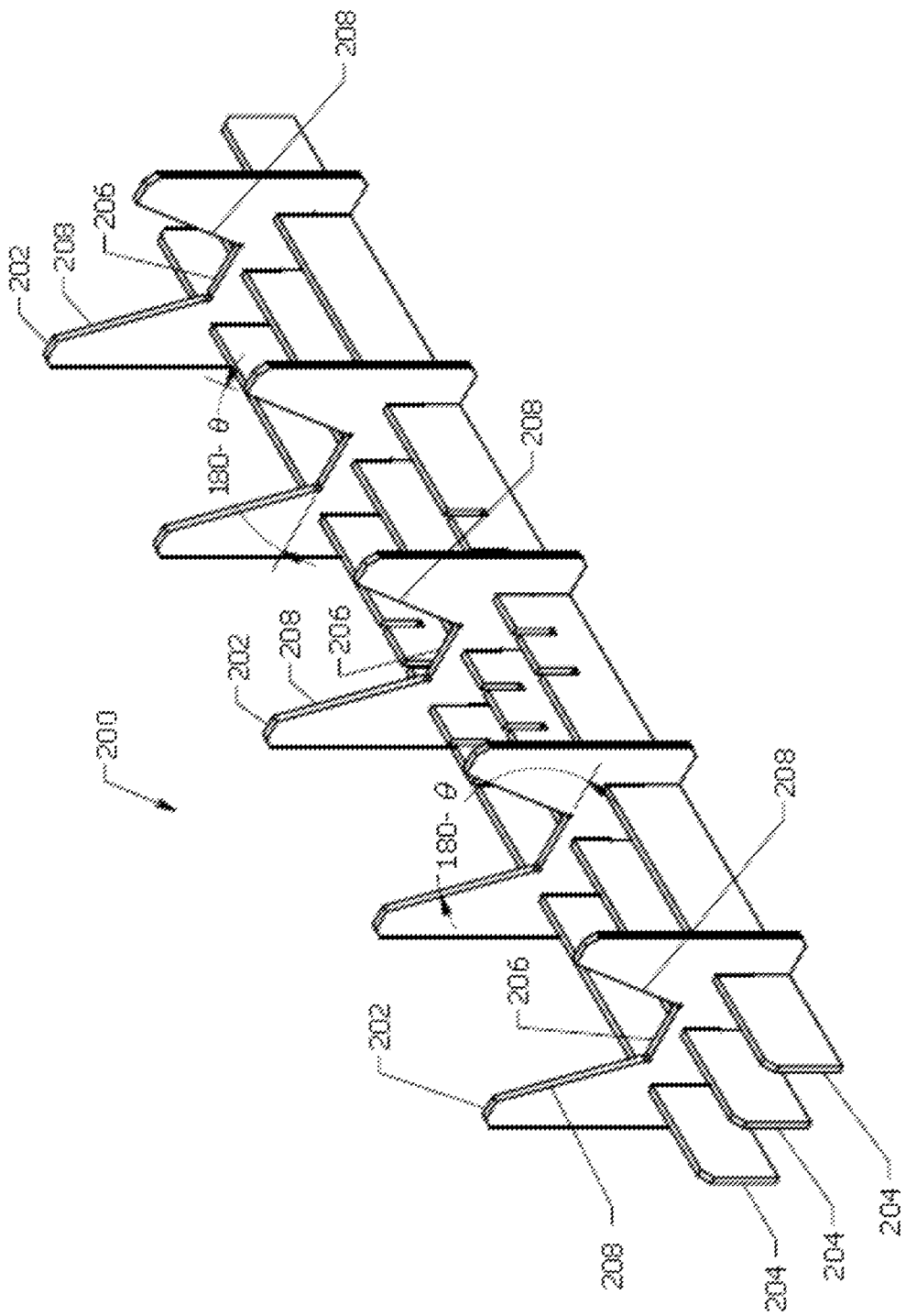
FIG. 10 is a perspective view of a measuring gauge used to measure the bend angle of the strip of spoke assemblies shown in FIG. 7, after bending.
Figure 10A:
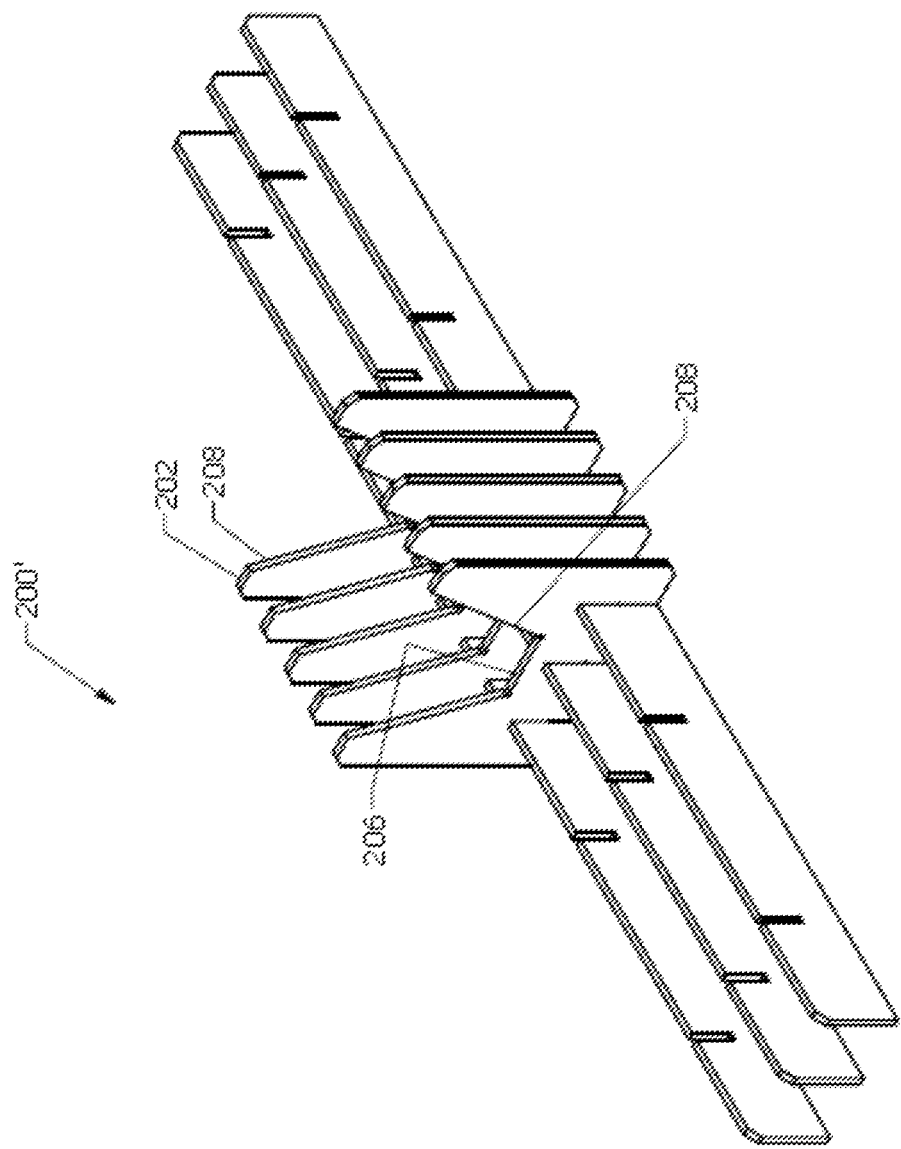
Figure 11:
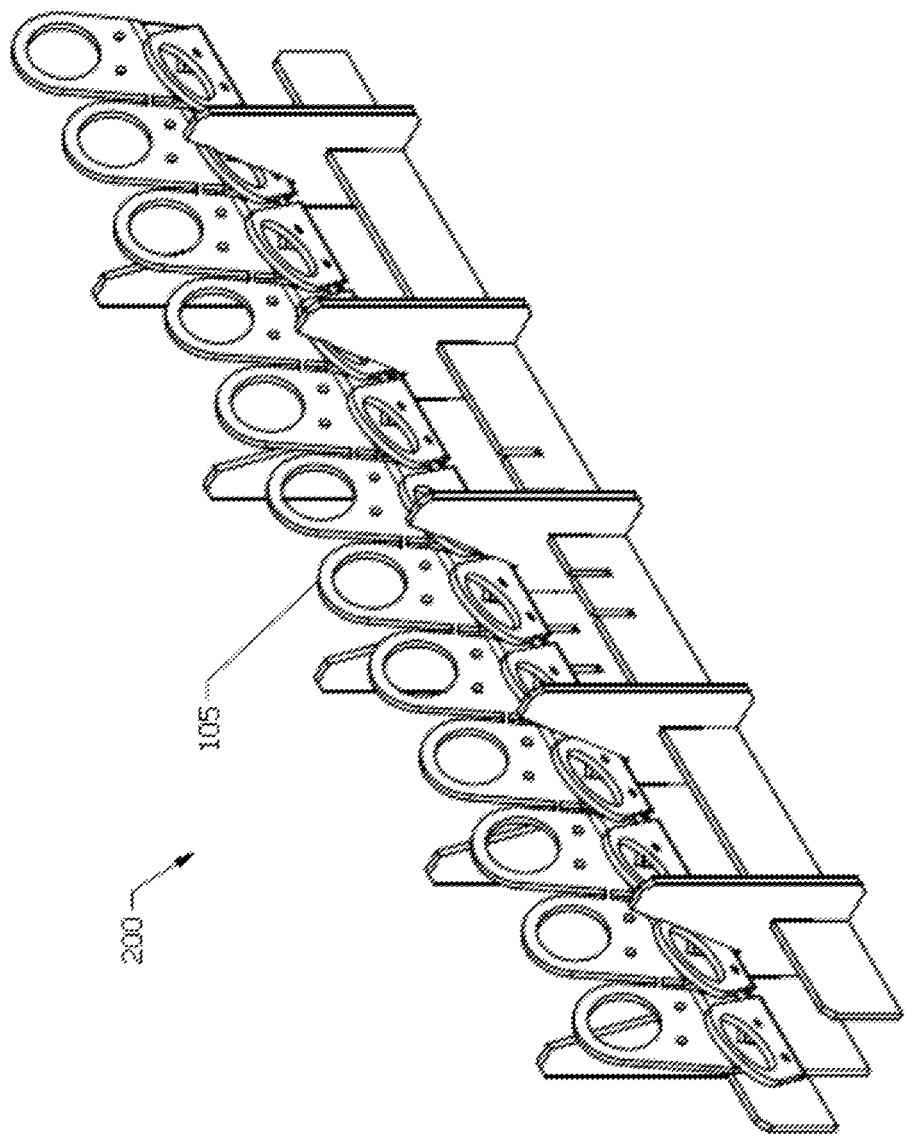
FIG. 11 is a perspective view of the strip of spoke assemblies shown in FIG. 8, inserted into the measuring gauge of FIG. 10.
Figure 11A:
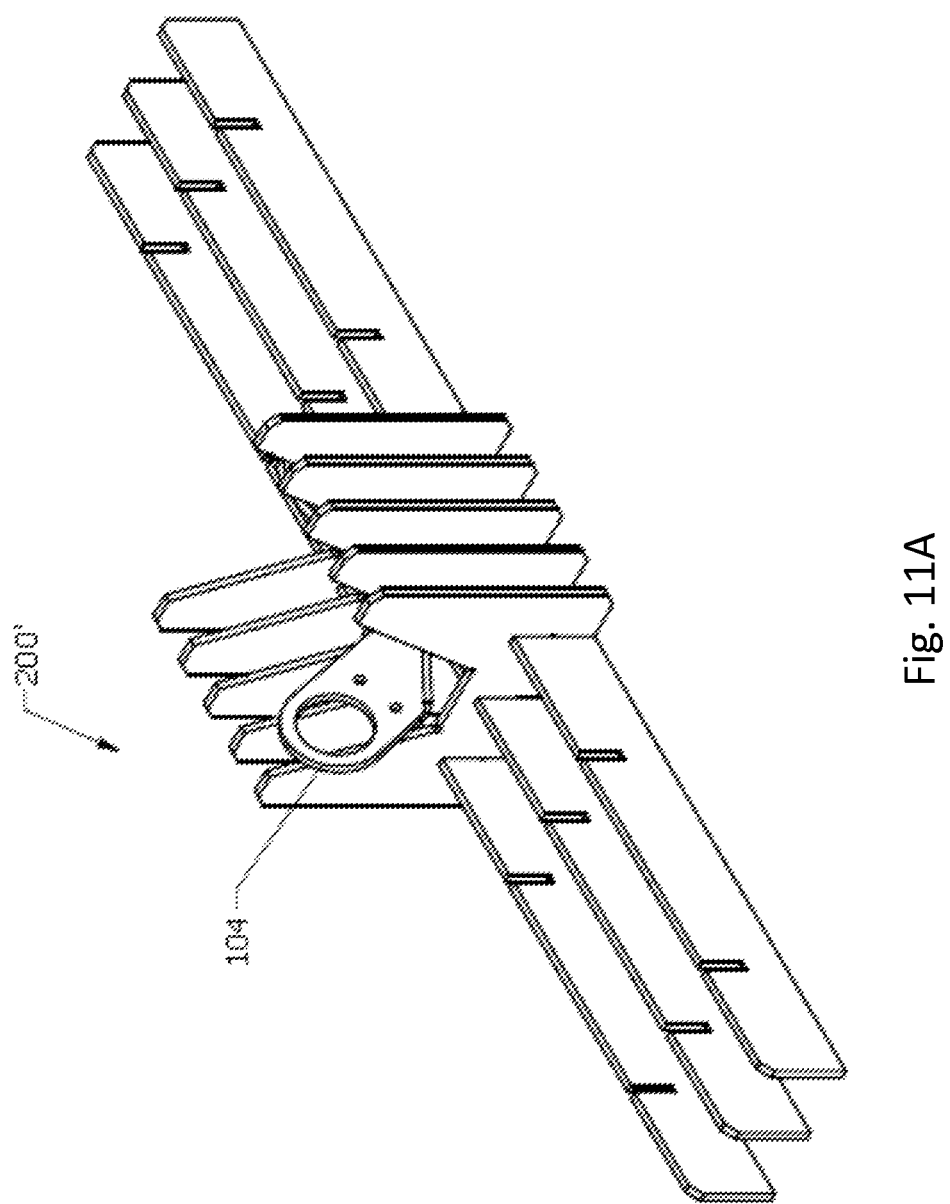

In order to confirm the accuracy of the bends, a bend measurement gauge 200, shown in FIG. 10, is used. Bend measurement gauge 200 includes a plurality of angled cradles 202 that are fixed to a series of parallel elongated bases 204. Each cradle 202 has a base 206 and sides 208 that each taper upward away from base 206 and angle of (180−θ) degrees. After sheet 105 is bent, sheet 105 is inserted into bend measurement gauge 200, as shown in FIG. 11. If base 120 engages bases 204 of bend measurement gauge 200 and spokes 132 engage tapered sides 208, then sheet 105 has been properly bent and each individual spoke assembly 104 can be separated from its adjacent spoke assembly 104 by cutting away ribs 139.

After the bends of all spoke assemblies 104 are verified, wheel assembly 100 may be fabricated. Two hub assemblies 102 are engaged to each other and fixedly connected to each other by connecting elements (not shown) extending through the through holes 118 in each of the two hub assemblies 102. Optionally, to save weight, the connecting elements may be omitted. Hub assemblies 102 are aligned with each other so that tangs 116 are offset from each other, as shown in FIG. 3.

A spoke assembly 104 is connected to the two hub assemblies 102 by inserting tangs 116 from the two hub assemblies 102 through slot 122 in base 120 of spoke assembly 104. This process is repeated around the perimeter of hub assembly 102 so that six (6) spoke assemblies 104 are connected to hub assembly 102. Each of the two spokes 132 on each spoke assembly 104 is in engagement with an adjacent spoke 132 on an adjacent spoke assembly 104 such that through openings 133 on adjacent spokes 132 are aligned with each other.

A roller axle assembly 106 is fixedly coupled to adjacent spokes 132 of adjacent spoke assemblies 104 by inserting a first end 150 of roller axle assembly 106 through generally circular slot 138 in each of the adjacent spokes 132 of adjacent spoke assemblies 104. The connection of adjacent spoke assemblies 104 to each other locks the spoke assemblies 104 to hub assembly 102, forming the wheel assembly 100 shown in all FIGS. 2 and 3.

A hex nut 152, which is larger than the diameter of circular slot 138 stops roller axle assembly 106 from being further inserted through circular slot 138. A circular bearing surface 154 is located inside circular slot 138 and engages the inside wall of circular slot 138. A securing nut 153, shown in FIG. 14, secures roller axle assembly 106 to spokes 132.

Figure 14:
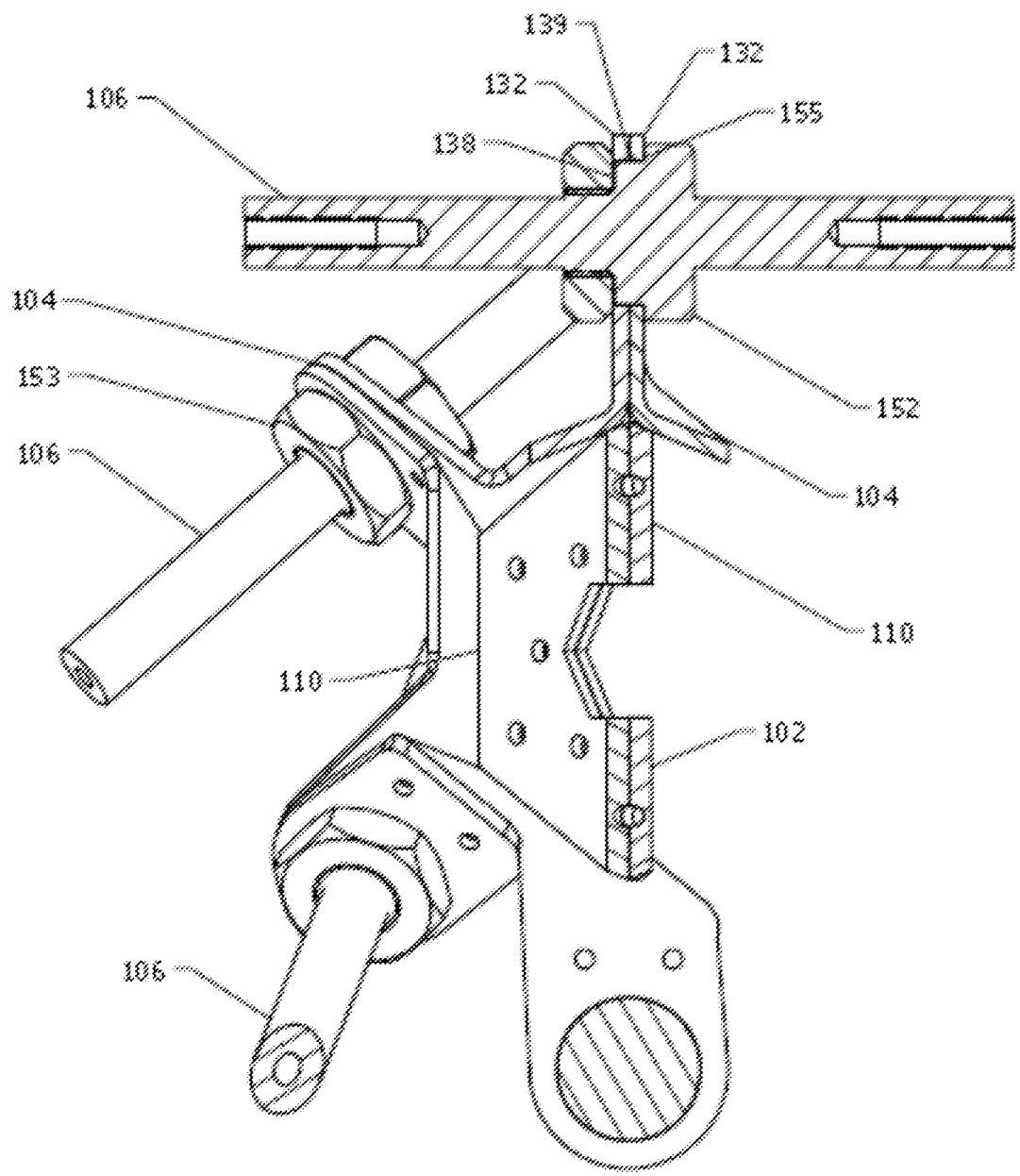
FIG. 14 is a sectional view of an alternative embodiment of a spoke axle according to the present invention.

Optionally, as shown FIG. 14, an alternative embodiment of a roller axle assembly 106' may include a flat surface 155 that is complementary to an optional corresponding flat surface 139, shown in FIG. 14, is formed in slot 138 such that, when roller axle assembly 106' is inserted through slot 138, flat surface 155 engages flat surface 139, preventing roller axle assembly 106' from rotating with respect to spoke 132. This feature enhances maintenance of wheel assembly 100 by simplifying the assembly and removal of roller axle assembly 106' from spokes 132.

Optionally, an alternative embodiment of a roller axle assembly 106 is provided. Instead of flat surface 155 used in roller axle assembly 106', a first splined surface (not shown) is used. A corresponding splined surface (not shown) formed along the inner perimeter of slot 138 is used to engage the first splined surface 157 and prevent roller axle assembly 106 from rotating with respect to spoke 132.

Figure 12:
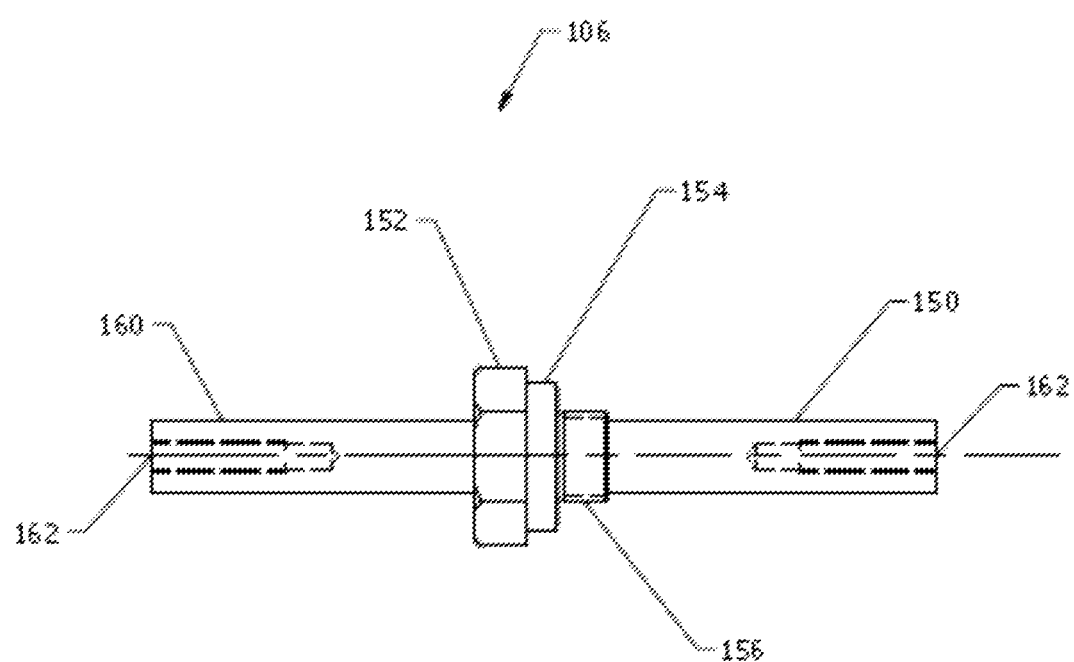
FIG. 12 is a side elevational view of an axle shown FIG. 1.
Figure 12A:
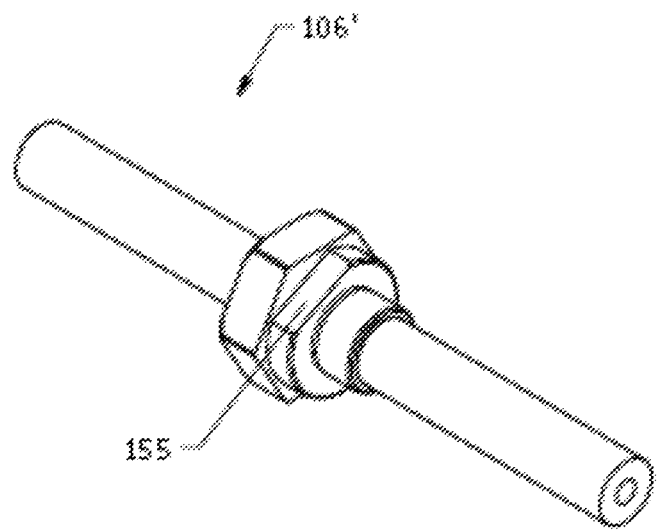
Figure 12D:
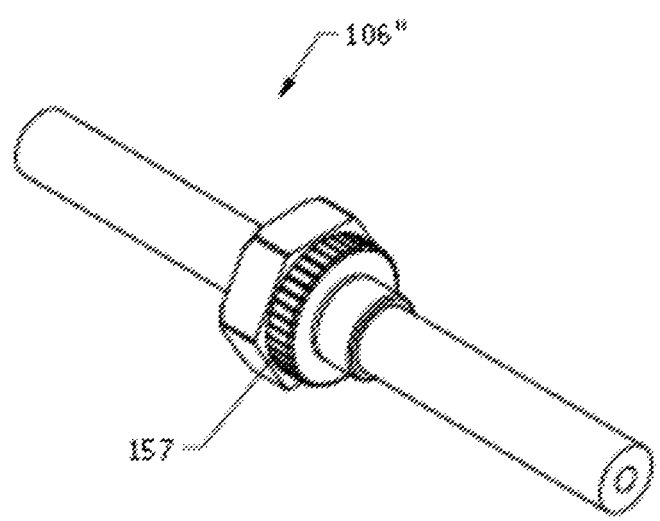
Figure 12B:
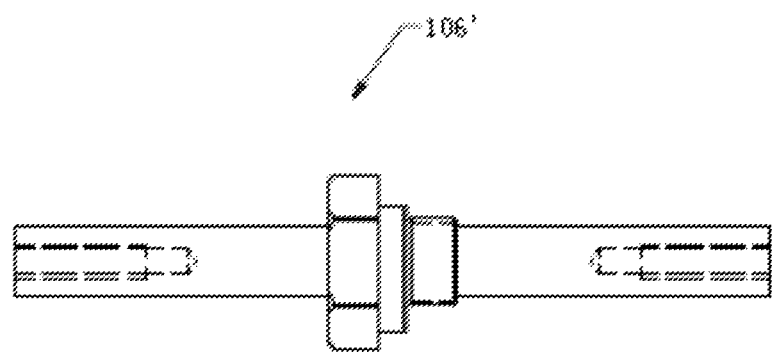
Figure 12C:
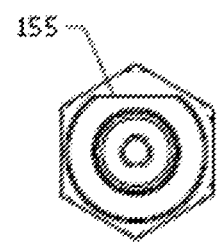
Figure 12E:
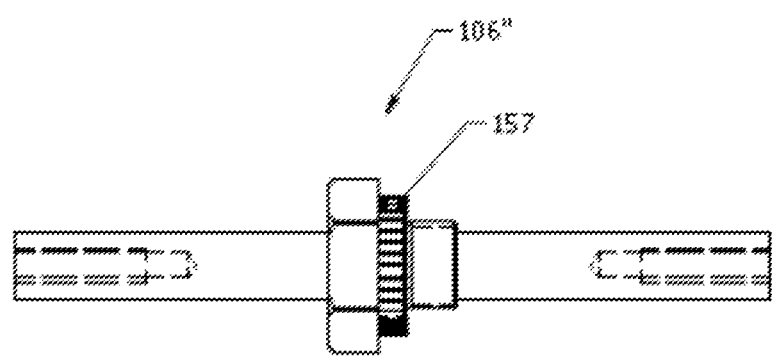
Figure 12F:
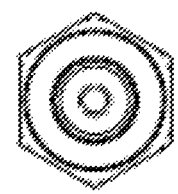
Figure 13:
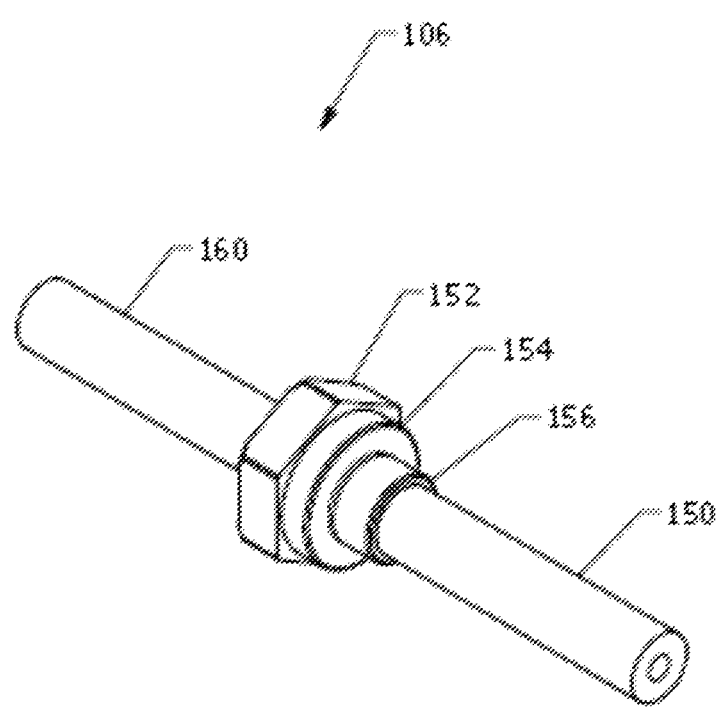
FIG. 13 is a perspective view of the axle of FIG. 12.

Referring back to FIG. 12, male threaded connection 156 extends outwardly of spoke 132 so that a nut 158 (shown in FIG. 1) can be inserted over first end 150 of roller axle assembly 106 and threaded onto threaded connection 156, thereby securing roller axle assembly 106 to the adjacent spokes 132. First end 150 and a second end 160 each have an internally threaded passageway 162 formed therein in order to secure a roller assembly (not shown) to each end of roller axle assembly 106.

While a roller assembly as disclosed in U.S. Pat. No. 8,011,735 is used with wheel assembly 100, those skilled in the art will recognize that other types of roller assemblies may be used with the wheel assembly of the present invention. For example, a roller (not shown) may be constructed with a core that includes a polymer base impregnated with a lubricious material, such as, for example, molybdenum disulfide. An advantage to such a construction is that, with such a core, some bearings may be eliminated.

An advantage that wheel assembly 100 provides is that wheel assembly 100 may be assembled according to whether the user needs a left-handed or a right-handed drive wheel. Wheel assembly 100 therefore reduces the need to carry spare left-handed and right-handed hubs, which can reduce maintenance costs for wheel assembly 100. Additionally, in the event that a spoke assembly 104 bends or breaks from hub assembly 102, the entire wheel assembly 100 does not need to be replaced; only the bent or broken spoke assembly 104 needs to be removed from hub assembly 102 and replaced with a replacement spoke assembly 104.

Further, the modularity of wheel assembly 100 eliminates the need for complex machining to machine a hub with integrated spokes. Wheel assembly 100 may be machined and/or stamped relatively easily from flat sheets of aluminum. This manufacturing process greatly reduces the cost of manufacturing each wheel assembly 100.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wheel assembly comprising:
    a) a generally hexagonally shaped hub assembly;
    b) a plurality of generally "U" shaped spoke assemblies extending outwardly from the hub assembly, each spoke assembly having a first spoke and a second spoke wherein the first spoke is in contact with a first adjacent spoke assembly and wherein the second spoke is in contact with a second adjacent spoke assembly; and
    c) a roller axle assembly extending through two adjacent of the spoke assemblies.

2. The wheel assembly according to claim 1, wherein the hub assembly comprises a first hub body and a second hub body adjacent the first hub body.

3. The wheel assembly according to claim 2, wherein each of the first hub body and the second hub body comprises a plurality of tangs extending outwardly therefrom, wherein the first hub body is aligned with the second hub body such that the tangs from the first hub body are offset from the tangs of the second hub body.

4. The wheel assembly according to claim 3, wherein each of the spoke assemblies comprises a base coupling the first spoke to the second spoke.

5. The wheel assembly according to claim 4, wherein the base engages the hub assembly.

6. The wheel assembly according to claim 1, wherein each of the spoke assemblies comprises a base coupling the first spoke to the second spoke.

7. The wheel assembly according to claim 1, wherein the roller axle assembly releasably couples the first spoke of one of the plurality of spoke assemblies to the first adjacent spoke assembly.

8. The wheel assembly according to claim 1, wherein the spoke assembly comprises a first flat surface and wherein the roller axle assembly comprises a complementary second flat surface such that the first flat surface engages the second flat surface to restrict rotation of the roller axle assembly with respect to the spoke assembly.

9. A wheel assembly comprising:
    a) a hub body having a perimeter, the perimeter having a plurality of sides and being polygonal in shape;
    b) a plurality of adjacent spoke assemblies extending around the perimeter, the plurality having the same number as the sides in the hub polygon, wherein each of the plurality of adjacent spoke assemblies comprises a base, a first spoke, and a second spoke, wherein each of the first spoke in the second spoke extends outwardly from the base; and
    c) a like plurality of roller axle assemblies, each of the like plurality of roller axle assemblies extending through a pair of the adjacent spoke assemblies.

10. The wheel assembly according claim 9, wherein the first spoke is in contact with a first of the plurality of adjacent spoke assemblies and wherein the second spoke is in contact with a second of the plurality of adjacent spoke assemblies.

11. The wheel assembly according to claim 10, wherein a first of the like plurality of roller axle assemblies extends through the first spoke and the first of the plurality of adjacent spoke assemblies and wherein a second of the like plurality of roller axle assemblies extends through the second spoke and the second of the plurality of adjacent spoke assemblies.

12. The wheel assembly according to claim 9, wherein the hub body further comprises a tang extending outwardly from each of the plurality of sides.

13. The wheel assembly according to claim 12, wherein each of the plurality of adjacent spoke assemblies further comprises a base having a slot formed in wherein each tang extends into a respective slot.

* * * * *